United States Patent [19]

Roberts

[11] 3,901,672
[45] Aug. 26, 1975

[54] FILTER SYSTEM FOR HALOGEN GAS DETECTOR
[75] Inventor: John A. Roberts, Lynnfield, Mass.
[73] Assignee: General Electric Company, Schenectady, N.Y.
[22] Filed: Dec. 26, 1973
[21] Appl. No.: 428,436

[52] U.S. Cl............... 55/387; 55/71; 73/421.5 R
[51] Int. Cl............................................. B01d 53/02
[58] Field of Search ............ 55/387, 437, 383, 367, 55/71; 73/421.5 R; 324/33

[56] References Cited
UNITED STATES PATENTS
2,996,661  8/1961  Roberts.................. 324/33
3,488,993  1/1970  Raynor.................. 73/421.5 R X Primary Examiner—Charles N. Hart
Assistant Examiner—Ethel R. Cross
Attorney, Agent, or Firm—Vale P. Myles

[57] ABSTRACT

A filter system for halogen gas detectors that prolongs the life of the filter used to supply purified air to the detector. Gas discharged by the vacuum pump used to draw sample gas and purified air into the detector is recirculated to the filter inlet. Excess gas entering the system, equal in volume to the sample gas, is discharged to the atmosphere on the inlet side of the filter through an orifice.

7 Claims, 1 Drawing Figure

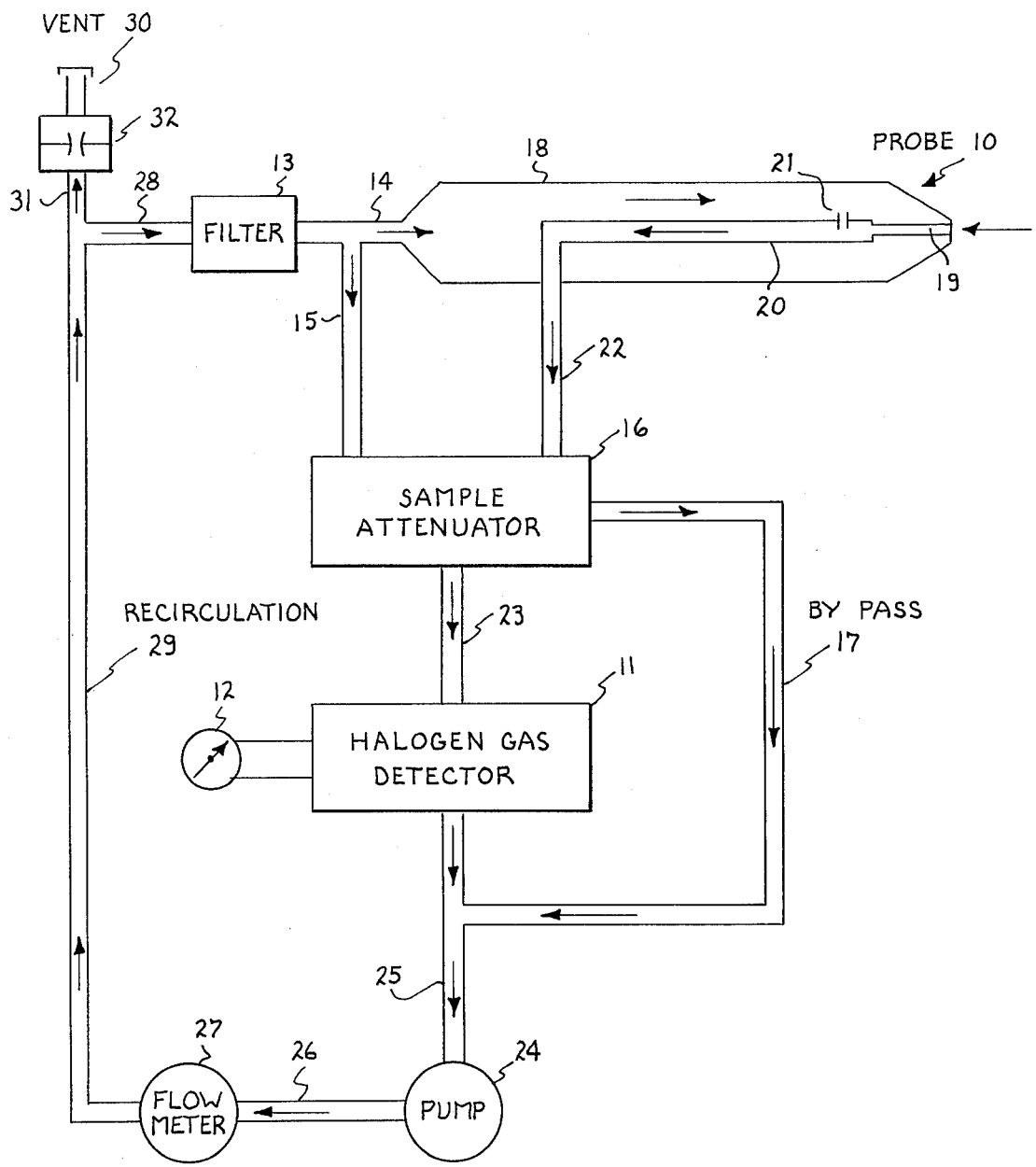

FILTER SYSTEM FOR HALOGEN GAS DETECTOR

BACKGROUND OF THE INVENTION

The present invention relates to halogen gas detectors and, more particularly, to filter system for prolonging the life of air filters used with such detectors.

Halogen gas detectors, often called leak detectors, are widely used to detect leaks in closed systems through the use of halogen tracer gases or vapors which pass into the surrounding atmosphere and are picked up by the detector. A method and apparatus for gas detection by such a method is described in U.S. Pat. No. 2,550,498 — Rice.

The efficiency and accuracy of halogen gas detectors can be reduced if the background atmosphere becomes contaminated with the halogen tracer gas. To prevent or reduce the effect of such contamination it is known to mix purified air with the leak sample in the detecting probe. One arrangement for accomplishing gas mixing is shown in U.S. Pat. No. 2,996,661 — Roberts.

To reduce the sensitivity of the detector and thereby increase the range of leak rates that can be detected without saturation of the detector, it is also known to use a sample attenuator to mix purified air with the sample gas drawn through the probe in predetermined ratios. The use of such a sample attenuator in a halogen gas detector system is disclosed and claimed in a copending application of John A. Roberts, Ser. No. 428,435, filed Dec. 26, 1973.

Both of these systems require the use of a filter to provide a source of purified air by removing halogen substances from background atmosphere pumped through the filter. Filtering material often used for this purpose is activated charcoal. After a period of use the filtering material becomes saturated and, therefore, inoperative. It must then be replaced with new filtering material. The filter replacement operation is a maintenance chore which should be reduced to a minimum especially when the detector is used for production line checking.

Accordingly, it is an object of the present invention to provide an improved filter system for a halogen gas detector that prolongs the life of the filtering material and thereby reduces maintenance time and expense required to maintain the detector in an operative condition.

A further object of the invention is to provide an improved gas pumping system for a halogen gas detector that greatly reduces the amount of contaminated background atmosphere that needs to be processed through the filter and thereby increases the filter life.

Further objects and advantages of the invention will become apparent as the following description proceeds.

SUMMARY

In accordance with the invention, a pump is used to draw purified air from the filter and sample gas from the probe into the gas detector, the pump being located on the downstream side of the gas detector. Instead of discharging the pump outlet into the surrounding atmosphere as has been the customary practice heretofore, the pump discharge is connected to the filter inlet to create a recirculating gas system. Excess gas in the system entering through the probe sample gas inlet, which is a small portion of the gas volume processed through the filter, is discharged into the atmosphere on the upstream side of the filter. In this manner, the load on the filter is greatly decreased and the life of the filtering material is prolonged many times.

For a better understanding of the invention, reference should be made to the following detailed description taken in connection with the accompanying drawing.

BRIEF DESCRIPTION OF THE DRAWING

The drawing shows, in schematic form, a halogen gas detector having a recirculation filter system embodying the invention.

DESCRIPTION OF THE ILLUSTRATED EMBODIMENT

Referring to the drawing, there is disclosed, in schematic form, a halogen gas detector comprising a probe 10 through which a sample gas is drawn and a halogen gas detector 11 which detects the presence of halogen substances in the sample gas and indicates the measured quantity on a suitable meter 12. A filter 13 supplies purified air through a conduit 14 to the probe 10 and also through a conduit 15 to a sample attenuator 16 whose function is to mix purified air from filter 12 with sample gas from probe 10 in predetermined fixed proportions prior to delivery of the mixed gases to the detector 11. The purpose of the dilution by the attenuator of the sample gas with purified air is to attenuate the detector response when measuring high leak rates and also to avoid high halogen concentrations which would saturate, and thereby disable, the detector. Gas flow through the detector beyond a predetermined rate is avoided by use of a conduit 17 which bypasses some of the sample gas from the probe around the detector. The mixing ratio of the gases in the sample attenuator may, for example, be changed by valves controlled by a detector sensitivity control (not shown) as disclosed and claimed in the abovementioned Roberts application.

The probe 10 has an elongated housing 18 having at its front end an opening 19 through which a sample gas is drawn when detecting a gas leak. The sample gas enters a coaxial mixing tube 20 where it is mixed with purified air from filter 13. The purified air enters the rear of the housing 18 through conduit 14 and passes into the mixing tube through an orifice 21. Here the function of the purified air is to render the detector less sensitive to background atmosphere which may be contaminated with halogen tracer gas. A probe construction suitable for this application is described in the abovementioned Roberts patent to which reference may be made for further constructional details. Sample gas from the probe enters the sample attenuator 16 through a conduit 22 and after mixing with purifying air supplied through conduit 15 the mixture enters the detector 11 through a conduit 23.

Purified gas from the filter 13 and sample gas from probe 10 are drawn into the detector by a pumping system comprising a vacuum pump 24 whose suction side is connected to the detector exhaust outlet by a conduit 25. The discharge side of the pump is connected by a conduit 26 to a flowmeter 27 used to adjust the gas pumping rate.

The filter 13 contains a suitable substance, such as activated charcoal, which removes from air entering the filter through inlet 28, any halogen substances present which may result from air contamination. Contamination of background air may, for example, result from leaks from vessels being tested in the vicinity of the detector.

In halogen gas detectors used heretofore the pump 24 has discharged the pumped gas into the atmosphere and the filter inlet 28 has been open to the atmosphere. With this arrangement, the filter must purify background air at a rate equal to the rate at which purified air is pumped through the detector by pump 24. According to the present invention, a gas recirculation system is used as a result of which the filter is required to filter air which is already mostly purified whereby the life of the filtering material is greatly prolonged.

The gas recirculation system is provided by a conduit 29 which connects the discharge of pump 24 and flowmeter 27 to the inlet 28 of the filter 13. With this arrangement, the major portion of the air passing through the filter is recirculated so that the load on the filtering material is decreased. Excess gas in the system equal to the volume of gas entering through probe inlet 19 is discharged to the atmosphere through a vent 30. The vent is connected to the circulating system on the upstream side of the filter by a conduit 31 provided with an orifice 32.

In actual practice, the ratio of purified air to leak sample in the probe 10 may be of the order of 9 to 1. Also the ratio of purified air entering sample attenuator 16 via conduit 15 to the sample gas entering the attenuator via conduit 22 may be as high as 99 to 1. Thus, it will be seen that the recirculation system will prolong the life of the filtering material from 9 to 99 times in a halogen gas detector of the type illustrated.

While the filtering system has been disclosed as applied to a particular type of halogen gas detector, it will be apparent to those skilled in the art that it may also be applied to other types in which filtered gas is required for mixing with sample gas which is pumped through a gas detector.

What is claimed as new and desired to be secured by Letters Patent of the United States is:

1. In a halogen gas detection system of the type comprising a gas sampling probe having an inlet through which a sample gas is drawn, a filter containing a filtering material which removes halogen substances from gas drawn through a filter, a halogen gas detector, and a pumping system for drawing sample gas from said probe and purified gas from said filter through said detector, said pumping system comprising a pump having its suction side connected to said detector on the downstream side, means for prolonging the life of said filtering material comprising:
   a. a recirculation conduit arranged to conduct gas discharged from said pump to the inlet side of said filter to form a recirculating system, and
   b. venting means connected in the recirculating system for discharging excess gas from said recirculating system.

2. The halogen gas detection system of claim 1 in which the venting means is connected to the upstream side of the filter.

3. The halogen gas detection system of claim 1 wherein purified air from the filter is mixed with sample gas from the probe prior to entering the gas detector.

4. The halogen gas detection system of claim 3 wherein the mixing of the purified air from the filter and the sample gas entering the probe inlet occurs within the probe.

5. The halogen gas detection system of claim 3 wherein the mixing of the purified gas from the filter with sample gas from the probe occurs in a sample attenuator for varying the ratio of the purified gas to sample gas in the mixture supplied to the detector.

6. The halogen gas detection system of claim 5 including additional means in the probe for mixing purified gas from the filter with sample gas entering the probe inlet.

7. The halogen gas detection system of claim 6 wherein the venting means is connected to the upstream side of the filter.

* * * * *